United States Patent Office 3,045,135
Patented July 17, 1962

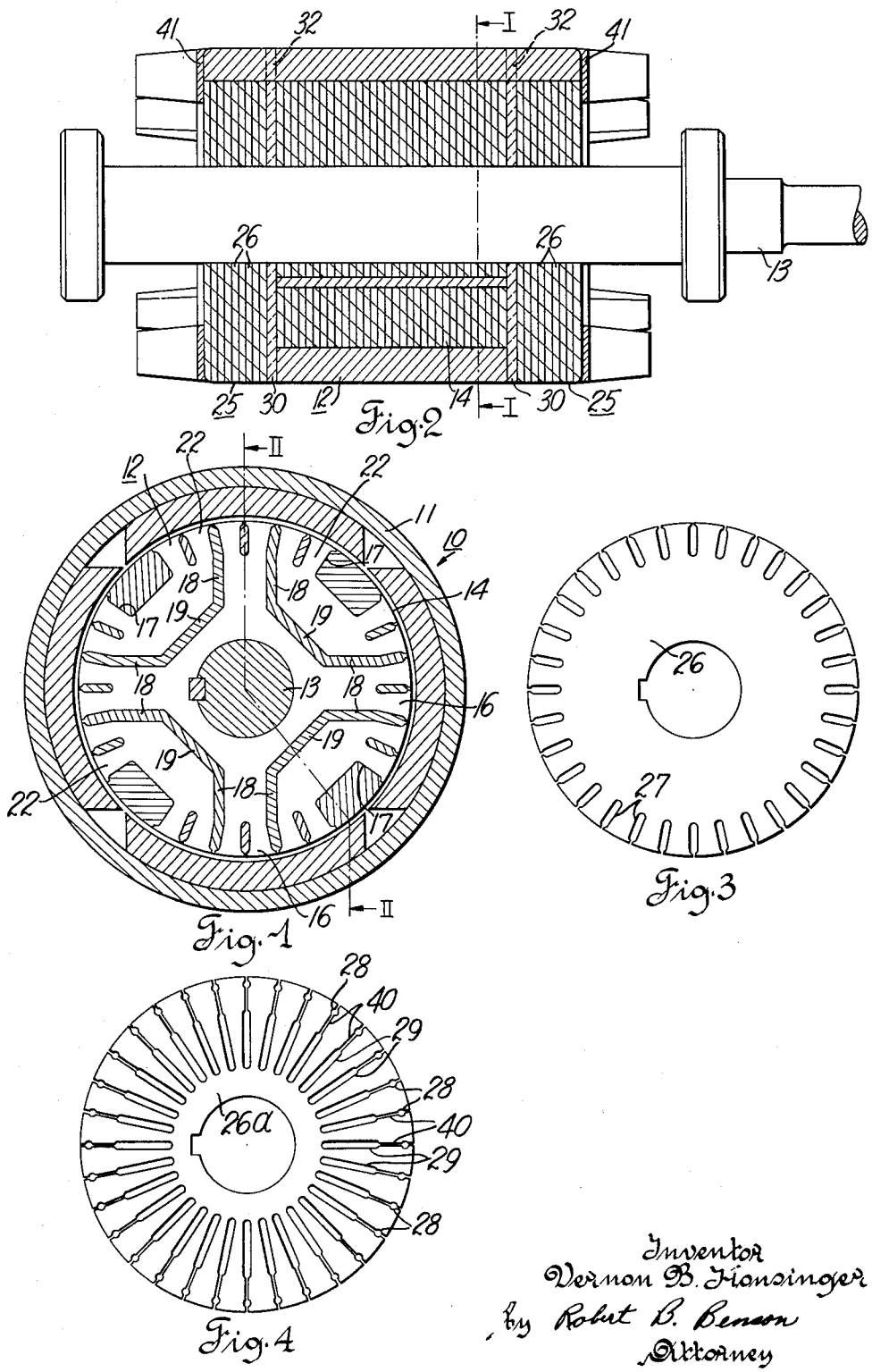

3,045,135
SYNCHRONOUS INDUCTION MOTOR
Vernon B. Honsinger, Cincinnati, Ohio, assignor to Allis-Chalmers Manufacturing Company, Milwaukee, Wis.
Filed Dec. 31, 1959, Ser. No. 863,199
11 Claims. (Cl. 310—212)

This application relates generally to synchronous induction motors. More specifically this application relates to synchronous induction motors having reduced starting currents.

Synchronous induction motors or reluctance motors accelerate to full speed on an induction motor principle and then lock in and utilize the pull-in torque of an unexcited synchronous machine as a driving force and run at synchronous speed. These motors are generally used where precise speed is required. However, one of the drawbacks of these motors especially in the larger sizes is the very high current drawn by the motors at starting. This high starting current is very detrimental to other apparatus and machines operating on the same circuit as the motor. For example, this large surge of current may cause lights to dim or flicker and other machines to slow down or even stop. These effects are undesirable especially in such industries as the synthetic fiber industry where precise speed control is required.

The improved synchronous induction motor of this invention provides the desirable characteristics of the normal synchronous induction machine, that is, it accelerates to full speed on an induction motor principle and runs on a reluctance principle and provides the further advantage of requiring a reduced starting current as compared with similar prior art machines. The reduced starting current is accomplished by providing a synchronous induction motor rotor with an extra set of iron laminations magnetically isolated from the rotor core. These extra sets of laminations have additional windings which are connected with the windings in the core to provide increased impedance in the starting circuit of the motor. This increased impedance has the effect of decreasing the current drawn by the motor during starting.

Therefore, it is the object of this invention to provide a new and improved synchronous induction motor.

Another object of this invention is to provide a new and improved synchronous induction motor having reduced starting currents.

Another object of this invention is to provide a new and improved rotor for a synchronous induction motor.

Other objects and advantages of this invention will be apparent when reading the following description in conjunction with the attached drawing, in which:

FIG. 1 is a cross section view of the motor of the invention taken along the line I—I of FIG. 2.

FIG. 2 is a cross section view of the rotor of FIG. 1 taken along the line II—II.

FIG. 3 is a plane view of a lamination in the end section of the rotor illustrated in FIG. 2.

FIG. 4 is a plane view of a modification of the lamination shown in FIG. 3.

As shown in the drawings the synchronous induction motor 10 of this invention has a stator 11 of the type used in a standard induction motor, a rotor 12 rotatable relative to the stator and a shaft 13 on which the rotor is mounted. The rotor 12 comprises a magnetic core 14 having a plurality of circumferentially spaced salient poles 16. The salient poles are separated by an axially extending groove 17.

In simplified theory, the torque generated by a reluctance motor may be expressed as a function of a constant divided by the difference between the direct axis flux and the quadrature axis flux. Therefore, by reducing the quadrature axis flux to a minimum while maintaining the direct axis flux at near its maximum the motor can be designed for maximum torque. Therefore, flux barriers are selectively located in the rotor core 14 to impede quadrature axis flux without significantly interfering with the direct axis flux.

To this end the depth of the grooves 17 is sufficient to minimize the quadrature axis flux of the rotor throughout the expanse of the groove. Furthermore, the poles 16 are divided by a pair of slots 18 extending radially inward from the periphery of the rotor. Each dividing slot is connected at its radial inner end to a dividing slot 18 in an adjacent pole 16 by suitable means such as the slot 19. However, each pole 16 may be provided with only a single radial slot. The purpose of these slots 18 and 19 is to divide the rotor core 14 into a plurality of magnetically isolated segments 22 to provide low reluctance paths for the direct axis flux. Furthermore the slots 18 and their interconnections 19 act as flux barriers to the quadrature axis flux that bypasses the grooves 17 and tends to flow from one interpolar area to another interpolar area. In other words, the flux which bypasses the axially extending grooves 17 is stopped by the radial dividing slots 18 or the connecting slots 19. On the other hand the desirable or useful direct axis flux flows substantially unimpeded from one salient pole to another through the low reluctance iron path.

The starting current in a motor of this type is a function of the applied voltage divided by the impedance of the motor. The impedance of the motor is made up of resistance elements and the reactance elements. Therefore, by increasing the reactance elements and/or the resistance elements the starting current of the machine is reduced. Resistance is proportional to the length of the conductor divided by the area. Reactance is more complicated and depends upon the shape of the conductors in the rotor core. In general, a high ratio of radial depth to width of a conductor indicates high reactance. Hence, in this motor the relatively large area and inherently low ratio of radial depth to width of the conductor in the axially extending grooves 17 makes this synchronous induction motor a low impedance motor therefore drawing a high starting current. However, by providing additional impedance in series with the windings of a synchronous induction motor the starting current can be reduced.

The motor 10 of this invention is provided with two sets 25 of magnetic material shown as iron laminations 26 axially spaced from the rotor core 14. These laminations 26 are provided with the normal induction motor winding slots 27 near their periphery. Interposed between these sets 25 of laminations and the rotor core 14 is a nonmagnetic material 30 for magnetically isolating the end lamination sets 25 from the rotor core. The purpose of magnetically isolating the sets from the rotor core is to reduce to a minimum the amount of leakage flux entering the end lamination sets 25 during synchronous operation. The nonmagnetic material 30 can be any suitable material well known in the art such as organic or inorganic insulation material or nonmagnetic conducting materials such as copper or aluminum. However, as shown in the drawings the sets are made up of laminations of insulation which have winding slots 32 near their periphery which are aligned with the winding slots 27 in the outboard sets 25 and with the slots 18 and grooves 17 in the rotor core 14 for receiving electrical conductors. Therefore, when the rotor 12 is die cast with a nonmagnetic electrically conducting material such as aluminum, the material that fills the winding slots in the sets 25 and the nonmagnetic laminations 26 is in series with the windings in the rotor core thereby increasing the impedance of the motor and hence decreasing the current drawn by the motor when starting.

The exact formation or design of the winding slots 27 in the outboard sets 25 is not essential to this invention. However, additional beneficial results can be obtained by designing the slots in the outboard sets to take advantage of what is known in the trade as deep bar effect and also double cage effect. Deep bar effect means that the winding slots are lengthened radially inward so that the ratio of the radial slot length to slot width is high. This, as has been explained, increases the reactance of the slot. In the double cage rotor, the outboard sets of laminations, such as the laminations 26 as shown in FIG. 4, are provided with two groups of winding slots comprised of outer winding slots 28 shown as round openings and inner winding slots 29 shown as elongated essentially rectangular openings. The two groups of winding slots 28, 29 are connected by a thin bridge 40 although this is not essential to the desired function and in some cases, the slots 28, 29 may be physically separated. In any case, when filled with an electrical conductor the outer group of slots 28 because of their low length to width ratio provide a high resistance, low reactance winding and the inner group of slots 29 because of their high length to width ratio provide a low resistance, high reactance winding. The two windings operating together provide low current and normal torque during starting. As the rotor accelerates and nears synchronous speed, the combined effect is to produce a low slip which enables the motor to pull into sychronism easier although this is offset by the increased inertia of the outboard sets. These effects just described apply to the outboard sets 25. The overall effect on the rotor 12 including the winding in the core is to greatly reduce the starting current of the motor.

When the rotor is die cast the grooves and slots are interconnected at the ends of the sets by suitable means such as the ring 41 to provide a squirrel cage winding for the motor.

Although but two embodiments have been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A rotor for a synchronous induction motor comprising: a magnetic core having a plurality of circumferentially spaced salient poles separated by axially extending grooves, a set of magnetic material at either end of said core and axially spaced therefrom, said sets of magnetic material having arcuately spaced winding slots next to the periphery, nonmagnetic material interpositioned between said core and said sets to magnetically isolate said core from said sets, said nonmagnetic material having winding slots connecting the slots in said sets with the grooves in said core, said slots and grooves being filled with a nonmagnetic electrically conducting material and interconnected with each other at the outward ends of said sets to form a rotor having a squirrel cage winding.

2. A rotor for a synchronous induction motor comprising: a magnetic core having a plurality of circumferentially spaced salient poles separated by axially extending grooves, said poles having arcuately spaced winding slots, a set of magnetic material at either end of said core and axially spaced therefrom, said sets of magnetic material having arcuately spaced winding slots next to the periphery, nonmagnetic material interpositioned between said core and said sets to magnetically isolate said core from said sets, said nonmagnetic material having winding slots connecting the slots in said sets with the slots and grooves in said core, said slots and grooves being filled with a nonmagnetic electrically conducting material and interconnected with each other at the outward ends of said sets to form a rotor having a squirrel cage winding.

3. A rotor for a synchronous induction motor comprising: a magnetic core having a plurality of circumferentially spaced salient poles separated by axially extending grooves, said poles having a dividing slot extending from the periphery of the rotor inward, the radially inner portion of said radial slot being connected to a radial slot in an adjacent salient pole, a set of magnetic laminations at either end of said core and axially spaced therefrom, said sets of laminations having arcuately spaced winding slots near its periphery, nonmagnetic material interposed between said core and said sets to magnetically isolate said core from said sets, said nonmagnetic material having winding slots connecting said slots in said sets to said slots and said grooves in said core, said slots and grooves being filled with a nonmagnetic electrically conducting material and interconnected with each other at the outward ends of said sets to form a rotor having a squirrel cage winding.

4. A rotor for a synchronous induction motor comprising: a magnetic core having a plurality of circumferentially spaced salient poles separated by axially extending grooves, said poles having a dividing slot extending from the periphery of the rotor inward, the radially inner portion of said radial slot being connected to a radial slot in an adjacent salient pole, a set of magnetic laminations at either end of said core and axially spaced therefrom, said sets of laminations having arcuately spaced winding slots near its periphery, nonmagnetic laminations interposed between said core and said sets to magnetically isolate said core from said sets, said nonmagnetic laminations having winding slots connecting said slots in said sets to said slots and said grooves in said core, said slots and grooves being filled with a nonmagnetic electrically conducting material and interconnected with each other at the outward ends of said sets to form a rotor having a squirrel cage winding.

5. A rotor for a synchronous induction motor comprising: a magnetic core having a plurality of circumferentially spaced salient poles separated by axially extending grooves, each of said poles having a plurality of winding slots, a set of magnetic material at either end of said core and axially spaced therefrom, said sets having arcuately spaced winding slots, said winding slots extending radially inward from the periphery of said rotor a substantial distance to provide a high reactance winding slot, nonmagnetic material interpositioned between said core and said sets to magnetically isolate said core from said sets, said nonmagnetic material having winding slots connecting the slots in said sets to said slots and said grooves in said core, said slots and grooves being filled with a nonmagnetic electrically conducting material and interconnected with each other at the outward ends of said sets to form a rotor having a squirrel cage winding.

6. A rotor for a synchronous induction motor comprising: a magnetic core having a plurality of circumferentially spaced salient poles separated by axially extending grooves, each of said poles having a plurality of winding slots near the periphery of said core, a set of magnetic material at either end of said core and axially spaced therefrom, said sets of magnetic material having two groups of arcuately spaced winding slots, one of said groups being positioned adjacent the periphery of said magnetic material, the other of said groups being positioned radially inward from said first group and having a larger radial length to arcuate width ratio than said first group, nonmagnetic material interpositioned between said core and said sets to magnetically isolate said core from said sets, said nonmagnetic material having winding slots connecting the slots in said sets to said slots and grooves in said core, said slots and grooves being filled with a nonmagnetic material and interconnected with each other at the outward ends of said sets to form rotors having a squirrel cage winding.

7. A rotor for a synchronous induction motor comprising: a magnetic core having a plurality of circumferentially spaced salient poles separated by axially extending grooves, said poles having a dividing slot extending from the periphery of the rotor radially inward, the radial inner portion of said slot being connected to a radial slot in an adjacent salient pole, a set of magnetic laminations at either end of said core and axially spaced therefrom, said sets of laminations having two groups of arcuately spaced winding slots, one of said groups being positioned adjacent the periphery of said magnetic material, the other of said groups being positioned radially inward from said first group and having a larger radial length to arcuate width ratio than said first group, nonmagnetic material interpositioned between said core and said sets to magnetically isolate said core from said sets, said nonmagnetic material having winding slots connecting the slots in said sets to said slots and grooves in said core, said slots and grooves being filled with a nonmagnetic material and interconnected with each other at the outward ends of said sets to form rotors having a squirrel cage winding.

8. A motor comprising: a stator, a rotor rotatably mounted within said stator, said rotor comprising: a magnetic core having a plurality of circumferentially spaced salient poles separated by axially extending grooves, a set of magnetic material at either end of said core and axially spaced therefrom, said sets of magnetic material having arcuately spaced winding slots next to the periphery, nonmagnetic material interpositioned between said core and said sets to magnetically isolate said core from said sets, said nonmagnetic material having winding slots connecting the slots in said sets with the grooves in said core, said slots and grooves being filled with a nonmagnetic material and interconnected with each other at the outward ends of said sets to form a rotor having a squirrel cage winding.

9. A motor comprising: a stator, a rotor rotatably mounted within said stator, said rotor comprising: a magnetic core having a plurality of circumferentially spaced salient poles separated by axially extending grooves, said poles having arcuately spaced winding slots, a set of magnetic material at either end of said core and axially spaced therefrom, said sets of magnetic material having arcuately spaced winding slots next to the periphery, nonmagnetic material interpositioned between said core and said sets to magnetically isolate said core from said sets, said nonmagnetic material having winding slots connecting the slots in said sets with the slots and grooves in said core, said slots and grooves being filled with a nonmagnetic material and interconnected with each other at the outward ends of said sets to form a rotor having a squirrel cage winding.

10. A motor comprising: a stator, a rotor rotatably mounted within said stator, said rotor comprising: a magnetic core having a plurality of circumferentially spaced salient poles separated by axially extending grooves, each of said poles having a plurality of winding slots near the periphery of said core, a set of magnetic material at either end of said core and axially spaced therefrom, said sets of magnetic material having two groups of arcuately spaced winding slots, one of said groups being positioned adjacent the periphery of said magnetic material, the other of said groups being positioned radially inward from said first group and having a larger radial length to arcuate width ratio than said first group, nonmagnetic material interpositioned between said core and said sets to magnetically isolate said core from said sets, said nonmagnetic material having winding slots connecting the slots in said sets to said slots and grooves in said core, said slots and grooves being filled with a nonmagnetic material and interconnected with each other at the outward ends of said sets to form rotors having a squirrel cage winding.

11. A rotor for a synchronous induction motor comprising: a stator, a cylindrical magnetic core having a plurality of circumferentially spaced salient poles separated by an axially extending groove, a set of magnetic laminations at either end of said rotor and spaced therefrom, electrical conductors in said sets, said grooves being filled with a nonmagnetic electrically conducting material and interconnected with said conductors in said sets and with each other to form a rotor with a squirrel cage winding.

References Cited in the file of this patent

UNITED STATES PATENTS

| 1,226,091 | McCollum | May 15, 1917 |
| 2,733,362 | Bauer et al. | Jan. 31, 1956 |
| 2,788,458 | Naul | Apr. 9, 1957 |
| 2,913,607 | Douglas et al. | Nov. 17, 1959 |